United States Patent
Jung et al.

(10) Patent No.: US 9,153,032 B2
(45) Date of Patent: Oct. 6, 2015

(54) CONVERSION METHOD AND APPARATUS WITH DEPTH MAP GENERATION

(75) Inventors: Yong Ju Jung, Daejeon-si (KR); Aron Baik, Yongin-si (KR); Du-Sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1005 days.

(21) Appl. No.: 12/453,115

(22) Filed: Apr. 29, 2009

(65) Prior Publication Data
US 2010/0073364 A1 Mar. 25, 2010

(30) Foreign Application Priority Data
Sep. 25, 2008 (KR) .................. 10-2008-0093956

(51) Int. Cl.
G06T 7/00 (2006.01)
(52) U.S. Cl.
CPC .............. G06T 7/0085 (2013.01); G06T 7/0063 (2013.01); *G06T 2207/10012* (2013.01)
(58) Field of Classification Search
CPC ... G06T 7/0079; G06T 7/0063; G06T 7/0081; G06T 7/0082; G06T 7/0083; G06T 7/0084; G06T 7/0085
USPC .......................................................... 345/419
See application file for complete search history.

(56) References Cited

U.S. PATENT DOCUMENTS

| | | | |
|---|---|---|---|
| 6,384,859 B1 | 5/2002 | Matsumoto et al. | |
| 6,584,219 B1 | 6/2003 | Yamashita et al. | |
| 7,787,658 B2 * | 8/2010 | Redert | 382/106 |
| 2007/0024614 A1 * | 2/2007 | Tam et al. | 345/419 |
| 2010/0033617 A1 * | 2/2010 | Forutanpour | 348/345 |

FOREIGN PATENT DOCUMENTS

| | | |
|---|---|---|
| JP | 11-8862 | 1/1999 |
| JP | 2002-123842 | 4/2002 |
| JP | 2004-320189 | 11/2004 |
| KR | 10-2005-0018034 | 7/2005 |
| KR | 10-2005-0078737 | 12/2005 |
| KR | 10-2001-0032346 | 3/2006 |
| KR | 10-2005-0050094 | 12/2006 |
| KR | 10-2007-0026403 A | 3/2007 |
| KR | 10-2008-0047673 | 5/2008 |

OTHER PUBLICATIONS

Wei, Qingqing, Converting 2D to 3D: A Survey, Dec. 2005, Information and Communication Theory Group (ICT), pp. 1-37.*
Vergauwen et al., Web-Based 3D Reconstruction Service, May 25, 2006, Machine Vision and Applications, pp. 411-426.*
Tam et al., 3D TV Content Generation: 2D-to-3D Conversion, Dec. 26, 2006, ICME 2006, pp. 1869-1872.*
Battiato et al., 3D Stereoscopic Image Pairs by Depth-Map Generation, Sep. 2004, Proceedings. 2nd International Symposium on 3D Data Processing, Visualization, and Transmission, pp. 124-131.*
Japanese Office Action for 2009-214604 dated May 7, 2013.
Korean Office Action issued on Sep. 5, 2014 in corresponding Korean Application No. 10-2008-0093956 (10 pages, with English translation).

* cited by examiner

*Primary Examiner* — Xiao Wu
*Assistant Examiner* — Matthew D Salvucci
(74) *Attorney, Agent, or Firm* — NSIP Law

(57) ABSTRACT

A conversion method and apparatus with a generating of a depth map for two dimensional (2D)-to-three dimensional (3D) conversion. A depth order may be restored based on a line tracing and an edge map generated from an input image, and a stereo image may be generated using depth information.

24 Claims, 8 Drawing Sheets

CONVERSION METHOD AND APPARATUS WITH DEPTH MAP GENERATION

CROSS-REFERENCE TO RELATED APPLICATIONS

This application claims the benefit of Korean Patent Application No. 10-2008-0093956, filed on Sep. 25, 2008, in the Korean Intellectual Property Office, the disclosure of which is incorporated herein by reference.

BACKGROUND

1. Field

One or more embodiments relate to a conversion method and apparatus with depth map generation, and more particularly a two dimensional (2D)-to-three dimensional (3D) conversion method and apparatus and corresponding depth map generation.

2. Description of the Related Art

Currently, a three dimensional (3D) display apparatus may graphically represent 3D images. Demands for 3D contents have also currently been increasing.

Further, since a stereoscopic 3D display has been commercialized and services associated with 3D contents, such as with 3D movies, have increased, users' desires for the same have increased. However, lack of 3D content prevents 3D display apparatuses from being commercialized in the current market. In general, two dimensional (2D) images with multiple viewpoints have been conventionally necessary to provide a 3D image. However, a single viewpoint-2D image may not be used together with the 2D images of multiple viewpoints.

Accordingly, inventors of the present invention have found that a technology to convert a 2D image/video into a stereo image and perform rendering in a stereoscopic 3D display is desired.

SUMMARY

One or more embodiments may provide a conversion method and apparatus, as well as a method and apparatus generating a depth map for corresponding two dimensional (2D)-to-three dimensional (3D) conversion which may be applied to/as a stereoscopic 3D TV, to thereby convert a 2D image into a stereoscopic 3D image and display the 3D image.

One or more embodiments may also provide a method and apparatus for generating a depth map for 2D-to-3D conversion which may provide a variety of 3D contents using a previously produced 2D image.

One or more embodiments may also provide a method and apparatus for generating a depth map for 2D-to-3D conversion which may be applied to a 2D-to-3D conversion chip or software, and thereby may be used for/as various image displays and image display apparatuses such as stereoscopic 3D displays/TVs, Digital Video Disc (DVD)/Blu-ray Disc (BD) players, and the like.

According to one or more embodiments, there may be provided a conversion method with a generated a depth map for two dimensional (2D)-to-three dimensional (3D) conversion, the method including generating an edge map using a determined edge of an input image, extracting an edge having an identified characteristic meeting a predetermined requirement from the edge map, mapping the extracted edge to an initial line map, and generating a line map including a plurality of lines generated by the mapping of the extracted edge to the initial line map, and generating the depth map to have a sequential depth order, using the plurality of lines of the line map.

The generating of the edge map may include extracting an edge from the input image based on a detected luminance difference of at least one pixel of the input image to generate the edge map.

Further, the extracting, the mapping, and the generating of the line map may include extracting an edge with an identified value being greater than a predetermined value in a defined direction from a defined border of the edge map to another border of the edge map, a mapping of the extracted edge having the identified value being greater than the predetermined value in the defined direction to the initial line map, and generating the line map including a plurality of lines generated by the mapping of the extracted edge having the identified value being greater than the predetermined value in the defined direction to the initial line map.

The generating of the depth map may sequentially increase or decrease a depth order of a region between lines of the plurality of lines to generate the depth map. Here, the region may be located between lines of the plurality of lines of the line map, and each region may have an identical depth order.

The plurality of lines may not cross each other and may be equal to or less than a predetermined gradient value.

The generating of the line map may further include preventing each of the plurality of lines from changing in a vertical direction, and applying a smoothness constraint to select a line for the line map nearest to the edge map.

The generating of the line map may further include applying an elasticity constraint to prevent any one of the plurality of lines from changing in a vertical direction with an identified value being greater than a predetermined value.

The generating of the edge map may further include down-scaling the input image.

The conversion method may further include up-scaling the depth map, and smoothing the depth map.

The conversion method may further include lateral-shifting the depth map based on a depth order of a location of each pixel of the depth map, and generating a stereo image based on the lateral-shifting.

Further, the conversion method may include generating a pictorial depth cue using the depth map, and regenerating the depth map using the pictorial depth cue.

According to one or more embodiments, there may be provided a conversion apparatus with a generating of a depth map for 2D-to-3D conversion, the apparatus including an edge sensing unit to generate an edge map using a determined edge of an input image, a line trace unit to extract an edge having an identified characteristics meeting a predetermined requirement from the edge map, map the extracted edge to an initial line map, and generate a line map including a plurality of lines generated by the mapping of the extracted edge to the initial line map, and a depth generation unit to generate the depth map to have a sequential depth order, using the plurality of lines of the line map.

The edge sensing unit may extract an edge from the input image based on a detected luminance difference of at least one pixel of the input image to generate the edge map.

In addition, the line trace unit may extract the edge with an identified value being greater than a predetermined value in a defined direction from a defined border of the edge map to another border of the edge map, map the extracted edge having the identified value being greater than the predetermined value in the defined direction to the initial line map, and generate the line map including a plurality of lines generated by the mapping of the extracted edge having the identified value being greater than the predetermined value in the defined direction to the initial line map.

The depth generation unit may sequentially increase or decrease a depth order of a region between lines of the plurality of lines to generate the depth map.

The region may be located between each of the plurality of lines of the line map, and each region may have a different depth order.

The plurality of lines may not cross each other and may be equal to or less than a predetermined gradient value.

Further, the line trace unit may prevent each of the plurality of lines from changing in a vertical direction, and may apply a smoothness constraint to select a line for the line map nearest to the edge map.

The line trace unit may further apply an elasticity constraint to prevent any one line of the plurality of lines from changing in a vertical direction with an identified value being greater than a predetermined value.

The conversion apparatus may further include a down-scaling unit to down-scale the input image.

The conversion apparatus may further include an up-scaling unit to up-scale the depth map, and a smoothing unit to smooth the depth map.

The conversion apparatus may further include a lateral shifting unit to lateral-shift the depth map based on a depth order of a location of each pixel of the depth map, and generate a stereo image based on the lateral-shifting.

The conversion apparatus may still further include a pictorial depth cue generation unit to generate a pictorial depth cue using the depth map, and a depth map regeneration unit to regenerate the depth map using the pictorial depth cue.

The conversion apparatus may be a stereoscopic display configured to display a corresponding 3D image or video, the conversion apparatus converting a corresponding input 2D image or video based on the depth map to the corresponding 3D image or video.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
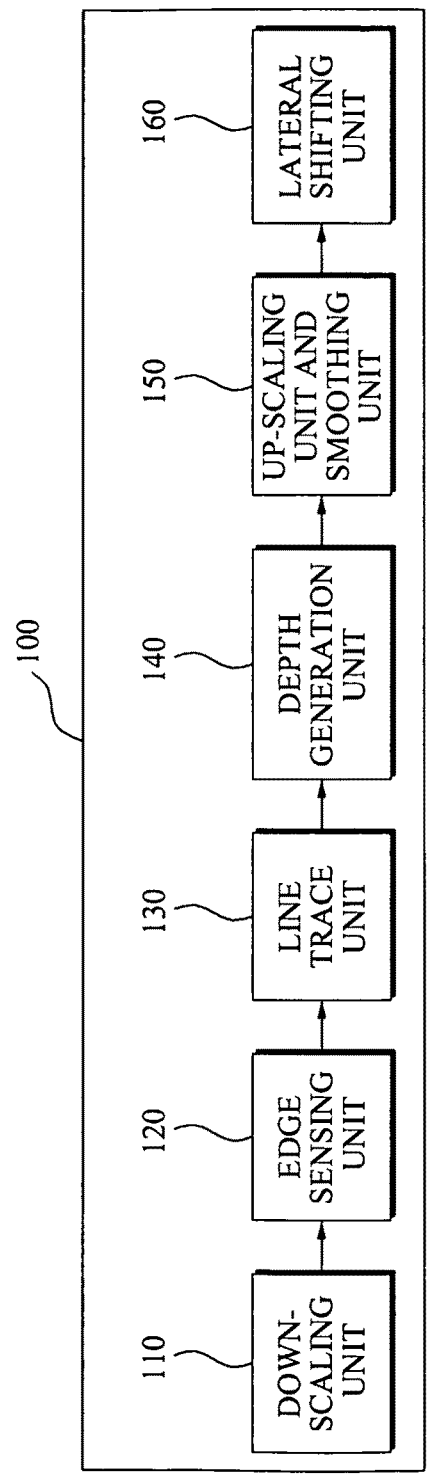
FIG. 1 illustrates a configuration of an apparatus for generating a depth map for two dimensional (2D)-to-three dimensional (3D) conversion, according to one or more embodiments.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates a configuration of a depth map generation apparatus generating a depth map for two dimensional (2D)-to-three dimensional (3D) conversion 100, according to one or more embodiments. The depth map generation apparatus may be a display device to output a 3D image based on the conversion.

As illustrated in FIG. 1, the depth map generation apparatus 100 may include a down-scaling unit 110, an edge sensing unit 120, a line trace unit 130, a depth generation unit 140, an up-scaling unit and smoothing unit 150, and a lateral shifting unit 160, for example. Herein, throughout the following description, the term apparatus should be considered synonymous with elements of a physical system, not limited to a single enclosure or all described elements embodied in single respective enclosures in all embodiments, but rather, depending on embodiment, is open to being embodied together or separately in differing enclosures and/or locations through differing elements. As only another example, a respective apparatus/system or method could also be controlled through one or more processing elements/devices or implemented through a distributed network, noting that additional and alternative embodiments are equally available.

The edge sensing unit 120 may generate an edge map using a detected edge of an input image.

Here, the edge sensing unit 120 may extract an edge based on a luminance difference of a pixel of the input image to generate the edge map.

The down-scaling unit 110 may down-scale the input image.

The line trace unit 130 may extract an edge with a value greater than a predetermined value from the edge map, map the extracted edge to a received initial line map, and generate a line map. The line map may include a plurality of lines generated by the mapping.

Specifically, the line trace unit 130 may extract an edge with the value greater than the predetermined value in a direction from a border to another border of the edge map. In addition, the line trace unit 130 may map the extracted edge to the initial line map, and generate the line map including the plurality of lines generated by the mapping.

The line trace unit 130 may prevent each of the plurality of lines from changing in a vertical direction, and apply a smoothness constraint to select a line nearest to the edge map.

The line trace unit 130 may apply an elasticity constraint to prevent any one of the plurality of lines from changing in a vertical direction in an amount greater than a predetermined threshold.

The depth generation unit 140 may generate a depth map including a sequential depth order, using the plurality of lines of the line map.

Specifically, in an embodiment, the depth generation unit 140 may sequentially increase or decrease a depth order of a region between lines of the plurality of lines to generate the depth map.

The region may be located between each of the plurality of lines of the line map, and each region may have a different depth order.

The plurality of lines may not cross each other and be equal to or less than a predetermined gradient value.

Also, according to one or more embodiments, the depth map generation apparatus 100 may include the up-scaling unit and smoothing unit 150. The up-scaling unit and smoothing unit 150 may up-scale the depth map generated by the depth generation unit 140, and smooth the depth map. In an embodiment, a corresponding up-scaling unit and smoothing unit may be distinct from each other.

The lateral shifting unit 150 may lateral-shift the depth map based on a depth order of a location of each pixel of the depth map, and generate a stereo image.

In addition, according to one or more embodiments, the depth map generation apparatus 100 may include a pictorial depth cue generation unit and a depth map regeneration unit. The pictorial depth cue generation unit may generate a pictorial depth cue using the depth map, and the depth map regeneration unit may regenerate the depth map using the pictorial depth cue.

Figure 2:
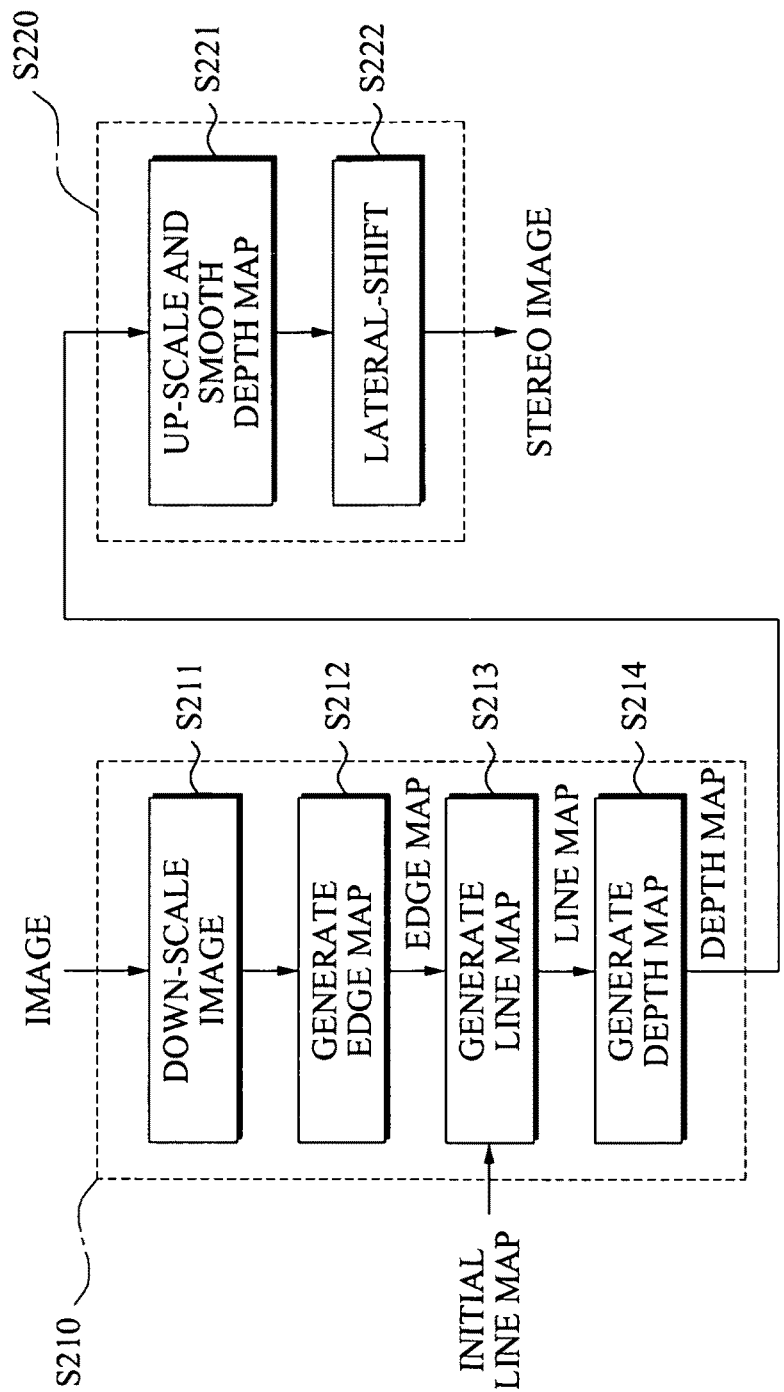
FIG. 2 illustrates a method of generating a depth map for 2D-to-3D conversion, according to one or more embodiments.

FIG. 2 illustrates a method of generating a depth map for 2D-to-3D conversion, according to one or more embodiments.

According to one or more embodiments, the method of generating a depth map for 2D-to-3D conversion may mainly, only as an example, include an initial depth estimation in operation S210 and a stereo image generation in operation S220.

In operation S211, according to one or more embodiments, an input image (or video) may be down-sized.

In this instance, the down-scaling of the input image (or video) may be for reducing complexity of applying/applied algorithms.

In operation S212, an edge on the input image (or video) may be sensed and an edge map using the sensed edge may be generated.

In this instance, the edge may be extracted based on a luminance difference of a pixel of the input image to generate the edge map.

In operation S213, an edge with a value greater than a predetermined value may be extracted from the edge map and an initial line map may be received. In addition, in operation S213, the extracted edge may be mapped to the received initial line map, and a line map generated. The line map may include the plurality of lines generated by the mapping.

In this instance, the method may include extracting the edge with the value greater than the predetermined value in a direction from a border to another border of the edge map, and mapping the extracted edge to the initial line map.

For example, a location of a strong edge may be traced from a left border to a right border of the edge map, and the line map generated.

In operation S214, a depth map, including a sequential depth order, may be generated using the plurality of lines of the line map.

In this instance, the depth map may be generated by sequentially increasing or decreasing a depth order of a region between lines of the plurality of lines. The region may be located between each of the plurality of lines of the line map, and each region may have a different depth order.

That is, when each region may have a different depth order and a new line is shown, a depth order may increase by the predetermined value. As only an example, a depth order of 0 may be assigned to a region at a bottom between two lines, and a depth order of 50 may be assigned to a region between at a top between the two lines.

In operation S221, the depth map may be up-scaled and the depth map smoothed. In addition, additional and/or alternative post-processing methods may be used to represent a 3D image more efficiently.

In operation S222, the depth map may be lateral-shifted based on a depth order of a location of each pixel of the depth map, and a stereo image generated.

According to one or more embodiments, an input 2D image may be converted into a stereoscopic 3D image, and thus various 3D contents may be provided using a previously produced 2D image.

Also, according to one or more embodiments, a 2D-to-3D conversion chip or software may be included, and thus the depth map generation apparatus may be applied to/as various image displays and image display apparatuses such as stereoscopic 3D displays/TVs, Digital Video Disc (DVD)/Blu-ray Disc (BD) players, and the like. The depth map generation apparatus may further be one of these various image displays and image display apparatuses.

Figure 3:
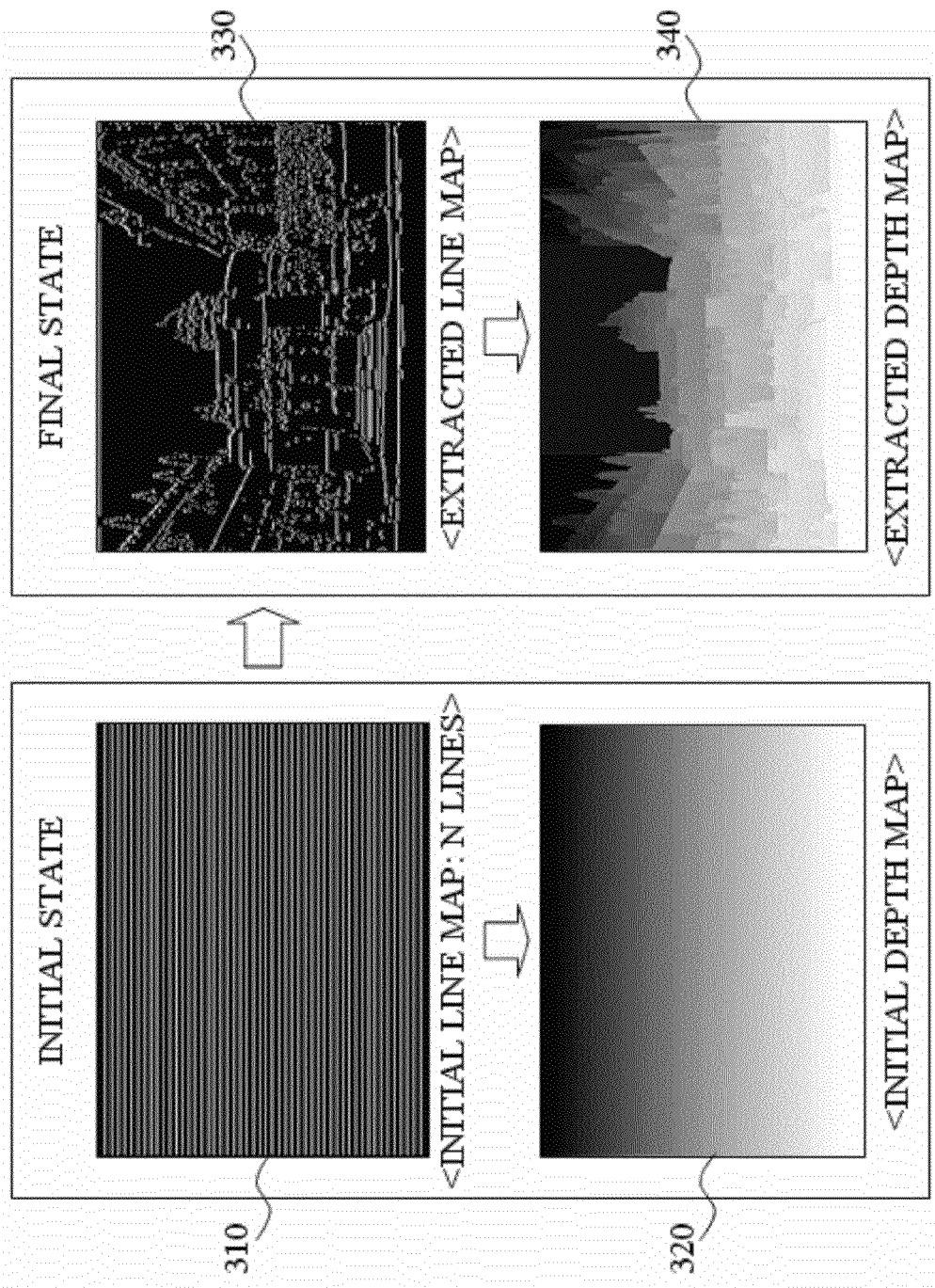
FIG. 3 illustrates an example of generating a depth map, according to one or more embodiments.
Figure 4:
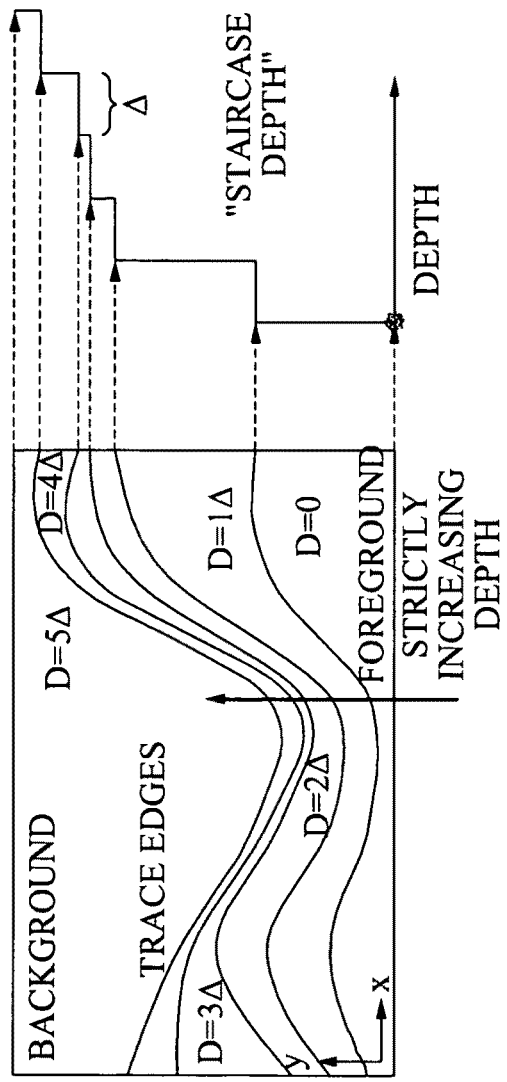
FIG. 4 illustrates an example of generating a depth map, according to one or more embodiments.

FIG. 3 illustrates an example of stages of a generating of a depth map, according to one or more embodiments. FIG. 4 illustrates an example of an incrementing of depth in a generating of a depth map, according to one or more embodiments.

FIG. 3 illustrates an initial line map 310, a depth map associated with the initial line map 320, a line map 330, and a depth map 340 associated with the line map 330.

Each region between lines of a plurality of lines may have a different depth order using the initial line map 310. In this instance, when a new line is shown and a depth order increases by a predetermined value, a depth map identical to an initial depth map 320 may be generated. In this instance, the initial depth map 320 may be the depth map associated with the initial line map 310.

Accordingly, the line map 330, optimized for characteristics of an input image, may be generated using the initial line map 310 including N parallel lines, for example. In addition, the depth map 340 may be generated based on the generated line map 330, noting that alternative embodiments are equally available.

As illustrated in FIG. 4, the plurality of lines may not cross each other and are equal to or less than a predetermined gradient value.

In this example, as illustrated in FIG. 4, each region between lines of a plurality of lines of the depth map 340 may have a different value. Further, every time a new line is shown, the depth order may increase by the predetermined value, for example. That is, as illustrated in this example FIG. 4, when a line map has five lines, a depth map including six depths generated by the five lines may be generated, noting that alternative embodiments are equally available.

Figure 5:
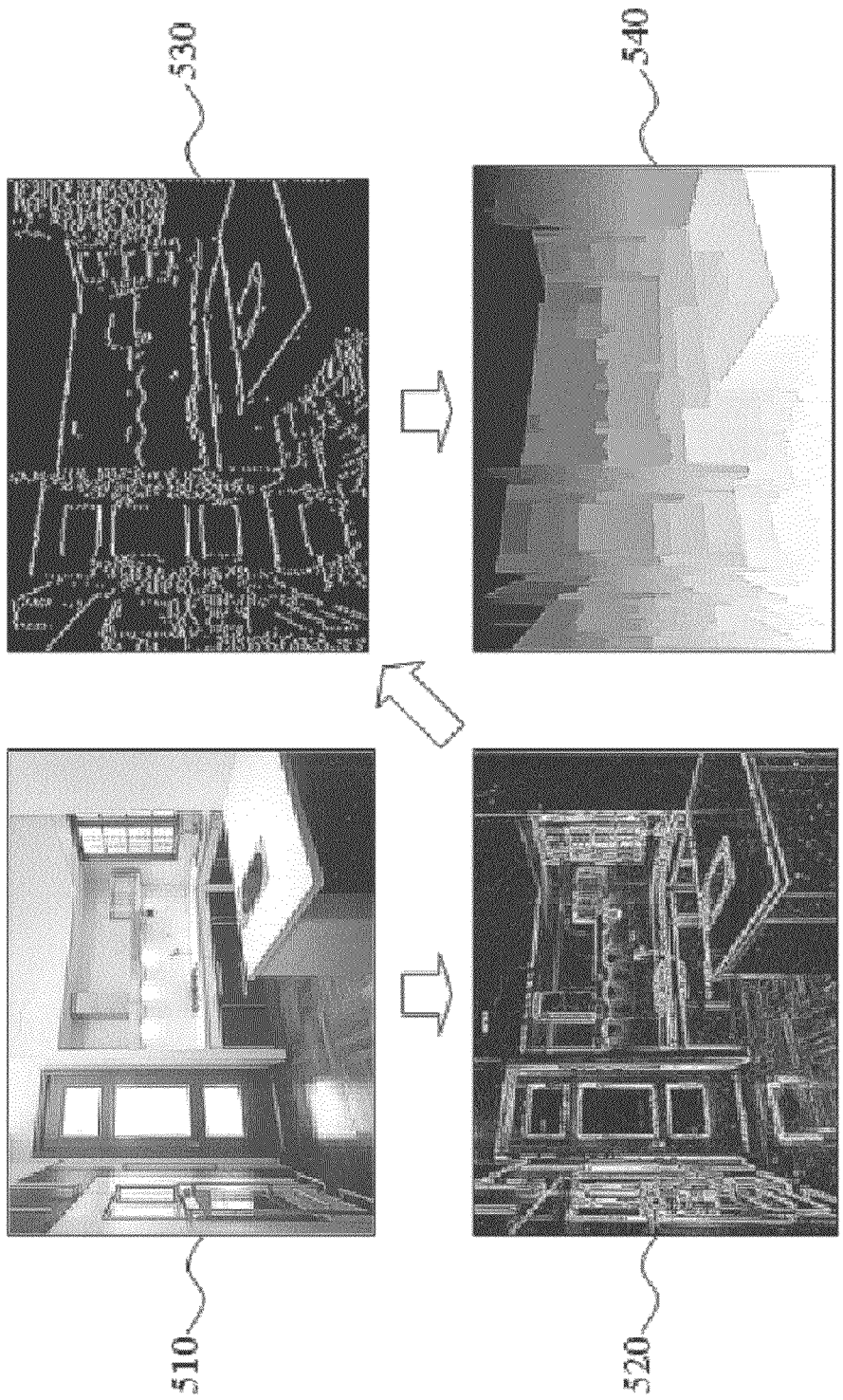
FIG. 5 illustrates an example of generating a depth map, according to one or more embodiments.
Figure 6:
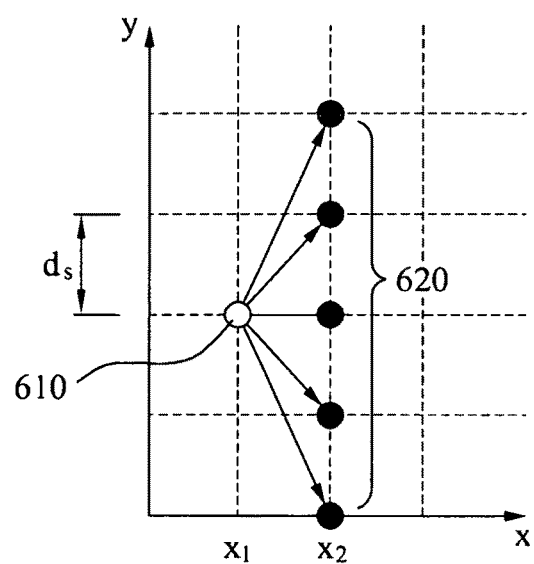
FIG. 6 illustrates a line tracing, according to one or more embodiments.
Figure 7:
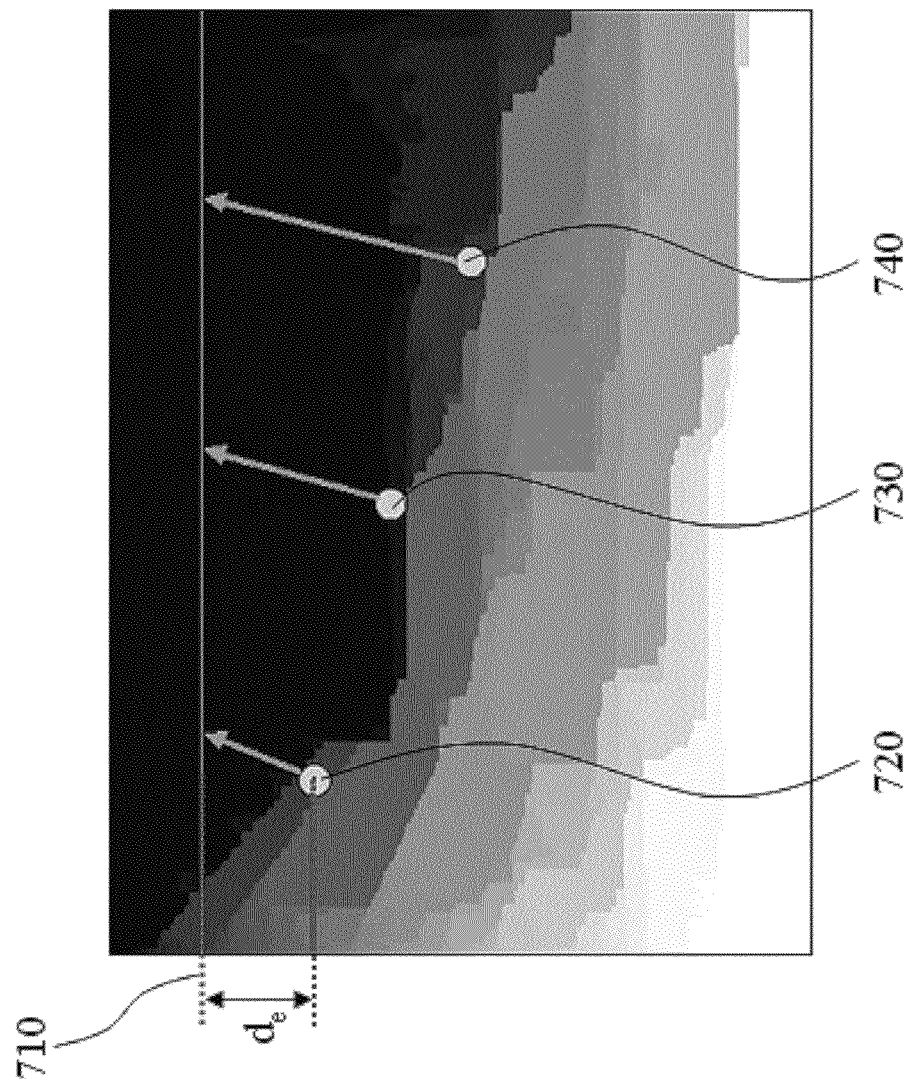
FIG. 7 illustrates a line tracing, according to one or more embodiments.

FIG. 5 illustrates an example of stages of a generating of a depth map, according to one or more embodiments. FIG. 6 illustrates a line tracing, according to one or more embodiments. FIG. 7 illustrates a further line tracing, according to one or more embodiments.

A depth map generation apparatus, according to one or more embodiments, may generate an edge map 520 using an edge of an input image 510, again noting that embodiments should not be construed as being limited to depth map generation, but rather the depth map generation apparatus may also be inclusive of a display device or controller to provide a converted 3D image/video based on a depth map.

Thus, an edge may be extracted, based on the edge having a identified value greater than a predetermined value, from the edge map 520, map the extracted edge to an initial line map, and a line map 530 may be generated. The line map 530 may include a plurality of lines generated by the mapping.

A depth map 540 may be generated using the plurality of lines of the line map 530. The depth map 540 may include a sequential depth order, for example, noting that alternative embodiments are equally available.

In an embodiment, the following conditions may be applied to the depth map generation when tracing a location of a strong edge, that is, the edge with an identified value greater than the predetermined value, and the line map 530 may be generated. In an embodiment, the number of generated lines may be fixed, and the generated lines may not cross each other. Also, in an embodiment, a gradient value of each of the lines may be less than or equal to a predetermined value at any point, and each of the lines may be generated in a direction from a border to another border of the edge map 520. Further, a depth order of a region divided by each of the lines may be different, also as an example.

As illustrated in the example line tracing of FIG. 6, when selecting a subsequent right point 620 from an initial left point 610 for each line to a right border, the depth map generation may include the selection of an optimal vector y. In an embodiment, the optimal vector y may enable an edge to be strong and a change in an y-axis direction to be smooth, and prevent the right point 620 from being too far from an initial line.

Accordingly, in such an embodiment, the depth map generation apparatus may trace a subsequent optimal pixel when line tracing.

In addition, here, a line trace constraint, a smoothness constraint, an elasticity constraint, and the like may be applied for an optimal line trace, for example.

Specifically, in such an example embodiment, the line trace constraint may be for tracing a strong edge, and the smoothness constraint is for penalization for a change of line in a vertical direction. As illustrated in FIG. 7, the elasticity constraint may be used for preventing a line 710 from being too far from a left border to prevent the line 710 from changing to points 720, 730, and 740 in a vertical direction.

In an embodiment, the above-described constraints may be given by the below Equation 1, for example.

$$E_{lt}(x,y)=\exp(-edge(x,y)/a)$$

$$E_s(x,y)=d_s(x,y)/b$$

$$E_e(x,y)=d_e(x,y)/c \quad \text{Equation 1}$$

Here, $E_{lt}(x, y)$ may denote a line trace constraint value, $E_s(x, y)$ may denote a smoothness constraint value, $E_e(x, y)$ may denote an elasticity constraint value, and a, b, and c may denote parameter values adjusting an amount of energy.

In this instance, a, b, and c may adjust energy amount based on characteristics of an input image and algorithm.

Accordingly, in an embodiment, based on the line trace constraint value $E_{lt}(x, y)$, smoothness constraint value $E_s(x, y)$, and elasticity constraint value $E_e(x, y)$, the line tracing may be formulated by the below Equation 2, for example.

$$\hat{y}=\arg\min_y\{\alpha E_{lt}(x,y)+\beta^E_s(x,y)+\gamma Y_e(x,y)\} \quad \text{Equation 2}$$

Here, α, β, γ may denote a weighting factor.

An optimization scheme may further be applied for the formulated line tracing. The optimization scheme may include a global optimization and local optimization, for example.

A simulated annealing may be generally used as the global optimization. When the simulated annealing is applied to the line tracing, a number of probabilities may be generated. Accordingly, when the simulated annealing is applied, a number of iterations may be implemented, which can result in high complexity for corresponding algorithm application.

Thus, in an embodiment and only as an example, an Iterated Conditional Modes (ICM) may be generally used as the local optimization. Here, ICM is referred to as a greedy algorithm, and may be appropriate for a low complexity algorithm.

Figure 8:
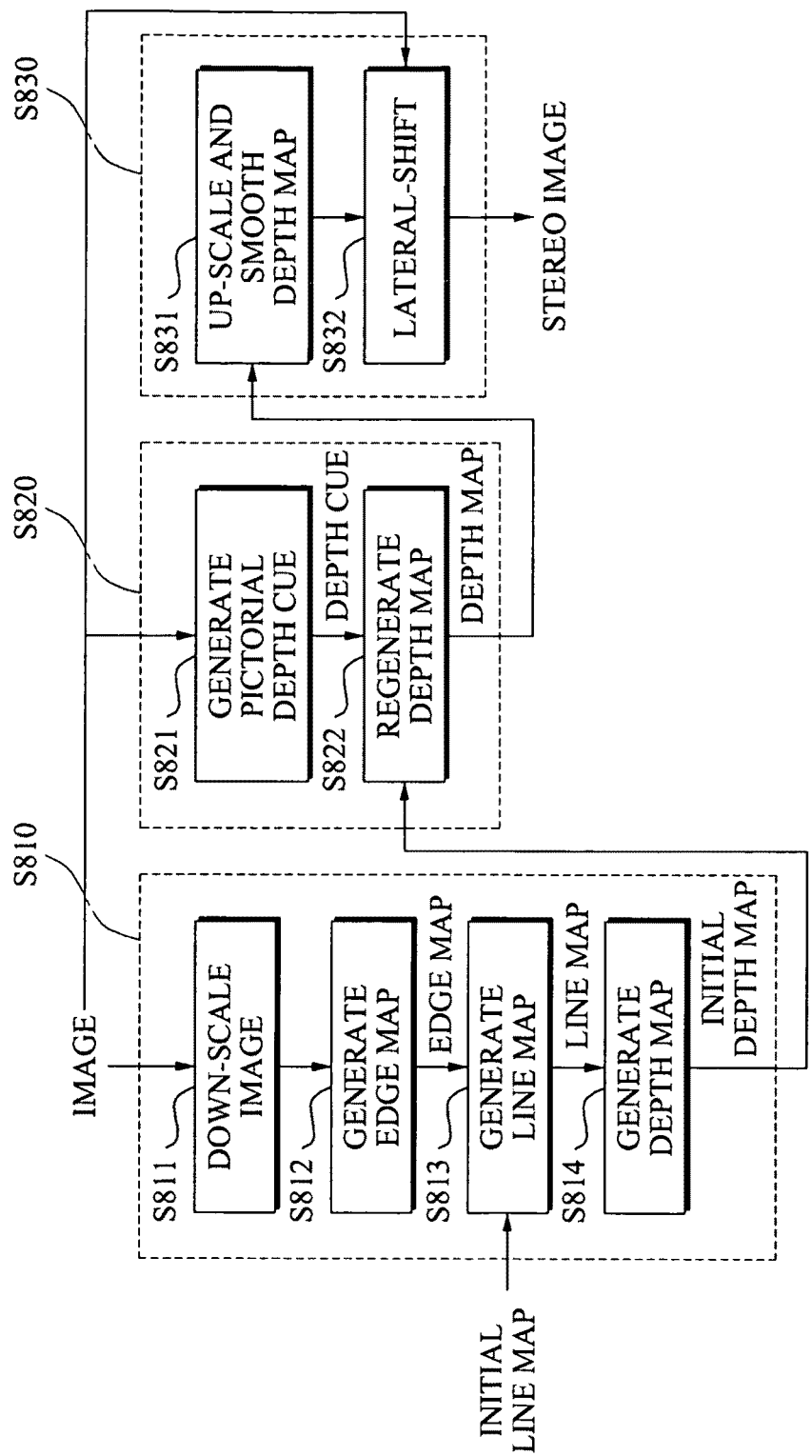
FIG. 8 illustrates a method of generating a depth map for 2D-to-3D conversion, according to one or more embodiments.

FIG. 8 illustrates a method of generating a depth map for 2D-to-3D conversion according to one or more embodiments.

In an embodiment, the method of generating a depth map for 2D-to-3D conversion may mainly include an initial depth estimation in operation S810, a depth map generation in operation S820, and a stereo image generation in operation S830, noting that alternative embodiments are equally available.

In operation S811, according to one or more embodiments, an input image (or video) may be down-scaled.

As an example, the down-scaling may be useful for reducing the ultimate needed complexity of algorithm.

In operation S812, an edge of the input image (or video) may be detected and generate an edge map using the sensed edge.

As only an example, the edge may be extracted based on a luminance difference of a pixel of the input image to generate the edge map.

In operation S813, the operation may include an extraction of an edge with a value greater than a predetermined value from the edge map, and an initial line map may be received. Also, in operation S813, the extracted edge may be mapped to the initial line map, and a line map generated. The line map may include a plurality of lines generated by the mapping, for example.

In this instance, the operation may include the extraction of the edge with an identified value greater than the predetermined value in a direction from a border to another border of the edge map, and the extracted edge may be mapped to the initial line map.

In operation S814, an initial depth map may be generated including a sequential depth order, using the plurality of lines of the line map.

Here, in an embodiment, the initial depth map may be generated by sequentially increasing or decreasing a depth order of a region between lines of the plurality of lines to generate the initial depth map. The region may be located between each of the plurality of lines of the line map, and each region may have a different depth order, for example.

In operation S821 a pictorial depth cue may be generated using the initial depth map. In operation S822, a depth map may be generated using the generated pictorial depth cue.

That is, according to one or more embodiments, a depth refinement process may be performed to obtain the depth map. For the depth refinement process, a depth map, e.g., the initial depth map obtained through the line tracing, may be used as initial depth information, and another pictorial depth cue extracted through an image analysis may be used.

For example, information about a linear perspective, overlapping among objects in an image, or texture gradient may be obtained through the image analysis. In addition, a 3D effect may be obtained by complementing the information based on depth information obtained using the line map.

In operation S831, the depth map may be up scaled and smoothed. In one or more embodiments, a variety of post-processing methods may also be applied to represent a 3D image more graphically, for example.

In operation S832, according to one or more embodiments, the depth map may be laterally shifted based on a depth order of a location of each pixel of the depth map, and a stereo image generated.

Accordingly, according to one or more embodiments, a method and apparatus for generating a depth map for 2D-to-3D conversion may be applied to a stereoscopic 3D TV. As noted above, embodiments should not be construed as being limited to such a depth map generation, but are also inclusive of such a stereoscopic 3D TV, for example, i.e., an embodiment of the present invention may be a stereoscopic 3D TV, or the like, noting again that alternative embodiments are equally available.

Images for a left eye and right eye of a viewer may be accordingly displayed in turn through a time-sequential stereoscopic display, for example, and the viewer may view a 3D image through shutter glasses, also as only an example.

As noted, according to one or more embodiments, a method and apparatus for generating a depth map for 2D-to-3D conversion, for example, may be inclusive of various types of stereoscopic 3D TVs as well as the time-sequential stereoscopic display, and thereby may convert a 2D image into a stereoscopic 3D image and display the 3D image.

Still further, according to one or more embodiments, a method and apparatus for generating a depth map for 2D-to-3D conversion may further provide a variety of 3D content from previously produced 2D content, e.g., image or video content.

In addition, according to one or more embodiments, a method and apparatus, or any aspect thereof, for generating a depth map for 2D-to-3D conversion may be implemented by and inclusive of a 2D-to-3D conversion chip or software included in at least one processing device or computer readable medium, and thereby may be used for various image displays and image display apparatuses such as stereoscopic 3D displays/TVs, DVD/BD players, and the like, for example.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A conversion method with a generated depth map for two dimensional (2D)-to-three dimensional (3D) conversion, the method comprising:
generating an edge map from an input image by extracting at least one edge from the input image based on a detected luminance difference;
extracting a strong edge having an identified characteristic meeting a predetermined requirement from the at least one edge of the edge map, such that the extracting is performed in a defined direction from a first border of the edge map to a second border of the edge map by sequentially selecting a subsequent optimal pixel, among surrounding pixels, to select an optimal vector;
generating a line map including a plurality of lines not crossing each other and a plurality of regions divided by the plurality of lines, wherein the generating of the line map comprises
mapping the extracted strong edge to an initial line map having predetermined parallel lines, and
applying an elasticity constraint to prevent any one line of the plurality of lines from changing in a vertical direction by an amount greater than a predetermined threshold; and
assigning a sequential depth order to the plurality of regions of the generated line map, thereby generating the depth map.

2. The conversion method of claim 1, wherein the detected luminance difference is a luminance difference of at least one pixel of the input image.

3. The conversion method of claim 1, wherein the extracting, the mapping, and the generating of the line map includes extracting an edge with an identified value being greater than a predetermined value, a mapping of the extracted edge having the identified value being greater than the predetermined value in the defined direction to the initial line map, and generating the line map including a plurality of lines generated by the mapping of the extracted edge having the identified value being greater than the predetermined value in the defined direction to the initial line map.

4. The conversion method of claim 1, wherein the generating of the depth map sequentially increases or decreases a respective depth order of each region between lines of the plurality of lines to generate the depth map.

5. The conversion method of claim 4, wherein the depth order of the region among the plurality regions is identical.

6. The conversion method of claim 1, wherein the plurality of lines do not cross each other and are equal to or less than a predetermined gradient value.

7. The conversion method of claim 1, wherein the generating of the line map further comprises applying a smoothness constraint to select a line for the line map nearest to the edge map.

8. The conversion method of claim 1, wherein the generating of the edge map further comprises down-scaling the input image.

9. The conversion method of claim 1, further comprising:
up-scaling the depth map; and
smoothing the depth map.

10. The conversion method of claim 1, further comprising:
lateral-shifting the depth map based on a depth order of a location of each pixel of the depth map, and generating a stereo image based on the lateral-shifting.

11. The conversion method of claim 1, further comprising:
generating a pictorial depth cue using the depth map; and
regenerating the depth map using the pictorial depth cue.

12. The conversion method of claim 1, further comprising an optimization scheme applied to the extracted edge, the optimization scheme including global optimization and local optimization.

13. A conversion apparatus with a generating of a depth map for 2D-to-3D conversion, the apparatus comprising:
an edge sensing unit, configured to generate an edge map from an input image by extracting at least one edge from the input image based on a detected luminance difference;

a line trace unit configured to
  extract a strong edge having an identified characteristic meeting a predetermined requirement from the at least one edge of the edge map, such that the extracted edge is extracted in a defined direction from a first border of the edge map to a second border of the edge map by sequentially selecting a subsequent optimal pixel, among surrounding pixels, to select an optimal vector,
  generate a line map including a plurality of lines not crossing each other and a plurality of regions divided by the plurality of lines, by mapping the extracted strong edge to an initial line map having predetermined parallel lines, and applying an elasticity constraint to prevent any one line of the plurality of lines from changing by a vertical direction in an amount granter than a predetermined threshold; and
  a depth generation unit configured to assign a sequential depth order to the plurality of regions of the generated line map, thereby generating the depth map.

14. The conversion apparatus of claim 13, wherein the detected luminance difference is a luminance difference of at least one pixel of the input image.

15. The conversion apparatus of claim 13, wherein the line trace unit extracts an edge with an identified value being greater than a predetermined value, maps the extracted edge having the identified value being greater than the predetermined value in the defined direction to the initial line map, and generates the line map including a plurality of lines generated by the mapping of the extracted edge having the identified value being greater than the predetermined value in the defined direction to the initial line map.

16. The conversion apparatus of claim 13, wherein the depth generation unit sequentially increases or decreases a respective depth order of each region between lines of the plurality of lines to generate the depth map.

17. The conversion apparatus of claim 16, wherein the depth order of the region among the plurality regions is identical.

18. The conversion apparatus of claim 13, wherein the plurality of lines are equal to or less than a predetermined gradient value.

19. The conversion apparatus of claim 13, wherein the line trace unit applies a smoothness constraint to select a line for the line map nearest to the edge map.

20. The conversion apparatus of claim 13, further comprising a down-scaling unit to down-scale the input image.

21. The conversion apparatus of claim 13, further comprising:
  an up-scaling unit configured to up-scale the depth map; and
  a smoothing unit configured to smooth the depth map.

22. The conversion apparatus of claim 13, further comprising:
  a lateral shifting unit configured to lateral-shift the depth map based on a depth order of a location of each pixel of the depth map, and generate a stereo image based on the lateral-shifting.

23. The conversion apparatus of claim 13, further comprising:
  a pictorial depth cue generation unit configured to generate a pictorial depth cue using the depth map; and
  a depth map regeneration unit configured to regenerate the depth map using the pictorial depth cue.

24. The conversion apparatus of claim 13, wherein the conversion apparatus is a stereoscopic display configured to display a corresponding 3D image or video, the conversion apparatus converting a corresponding input 2D image or video based on the depth map to the corresponding 3D image or video.

* * * * *